W. LIEDKE.
VAPOR LAMP.
APPLICATION FILED OCT. 13, 1911.
1,070,349.
Patented Aug. 12, 1913.
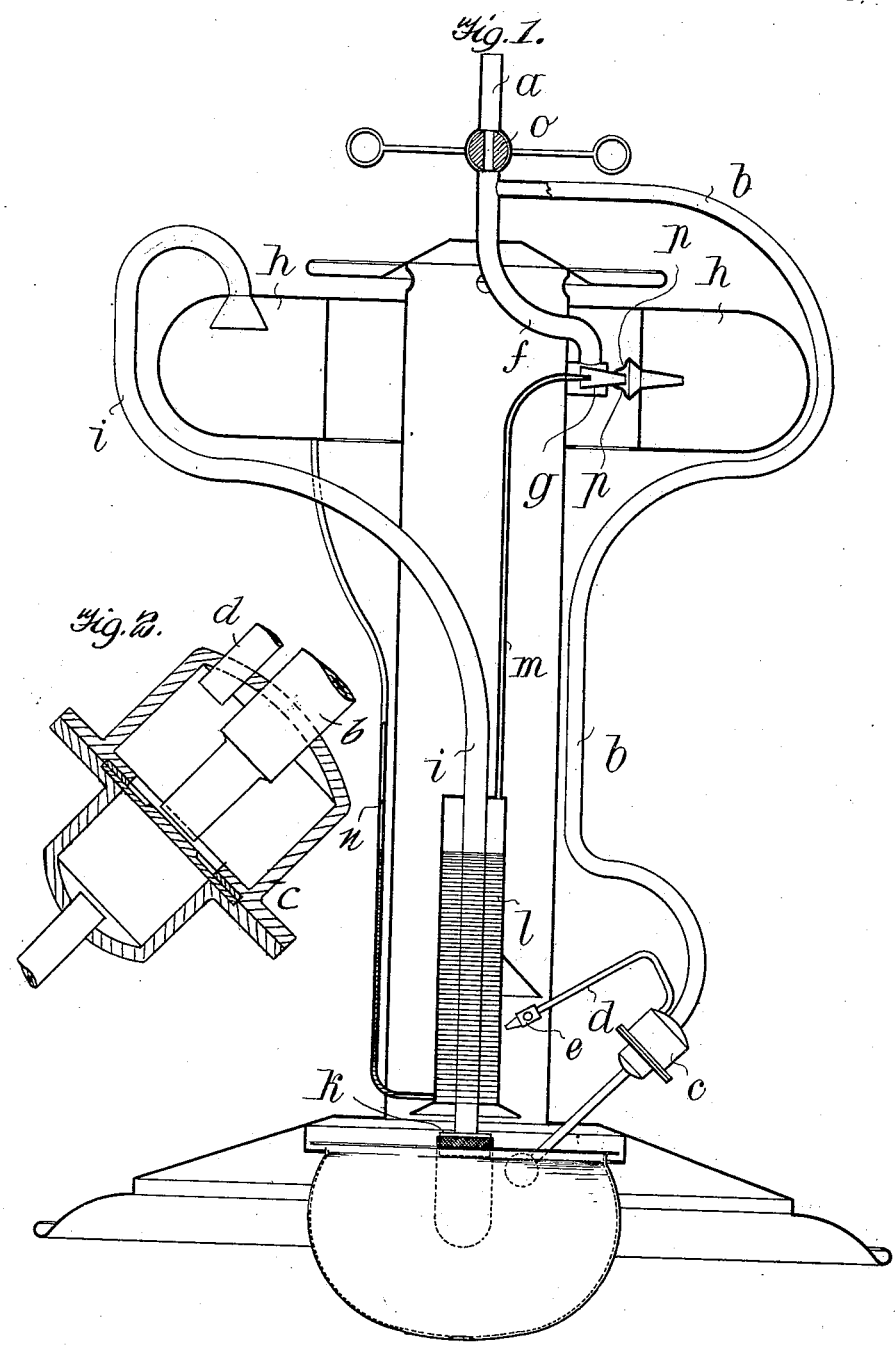
WITNESSES
J. P. Davis
L. J. Gallagher
INVENTOR
Willibald Liedke
BY Munn & Co
ATTORNEYS

UNITED STATES PATENT OFFICE.

WILLIBALD LIEDKE, OF BERLIN-CHARLOTTENBURG, GERMANY.

VAPOR-LAMP.

1,070,349.  Specification of Letters Patent.  Patented Aug. 12, 1913.

Application filed October 13, 1911. Serial No. 654,447.

*To all whom it may concern:*

Be it known that I, WILLIBALD LIEDKE, engineer, a subject of the Emperor of Germany, residing at Berlin-Charlottenburg, in the Empire of Germany, have invented a certain new and useful Vapor-Lamp, of which the following is a specification.

This invention relates to vapor lamps, including certain new and useful improvements in a main burner and the means by which it is supplied with vapor, and a pilot flame, the latter operating to start the main burner and being itself cut off when the main burner is lighted.

According to this invention the pilot flame gas supply is automatically shut off by the action of a thermostatic valve.

In the accompanying drawing, Figure 1 is a central vertical section through the lamp constructed in accordance with my invention, Fig. 2 is a detail section, on an enlarged scale, taken through the thermostatic valve.

$a$ is the main gas supply pipe of the lamp. $b$ is a branch pipe leading from the pipe $a$ to a thermostatic valve $c$. This valve $c$ is connected by a pipe $d$ to a Bunsen burner $e$.

$f$ is a continuation of the gas supply pipe $a$, opening into the casing of an injector $g$ that delivers into a chamber $h$. This chamber $h$ is intended to receive the mixture of gas and air for operating the lamp, which mixture is led thence by a pipe $i$ to the lamp burner $k$.

$l$ is an annular vessel surrounding the pipe $i$. It is adapted to contain a substance capable of being gasified or vaporized by heat, for instance mercury. A pipe $m$ leads from the top of the vessel $l$ to the injector $g$, and a pipe $n$ connects the bottom of the chamber $h$ to the lower part of the vessel $l$.

The operation of the apparatus is as follows: When the gas cock $o$ in the gas pipe $a$ is opened, gas passes through the pipe $b$, valve $c$ and pipe $d$ to the Bunsen burner $e$ and after the mixture of gas and air is ignited, the flame from the burner $e$ will heat the mercury in the vessel $l$. The mercury is thereby converted into vapor which passes through the pipe $m$ to the injector $g$ whence it issues, as a jet which draws in air through the apertures $p$ and also draws in gas from the pipe $f$. This mixture of gas and air is compressed in the chamber $h$ whence it passes through the mixing pipe $i$ to the incandescent lamp burner $k$. The mercury vapor issuing from the injector $g$ becomes condensed to liquid in the chamber $h$ which flows out through the pipe $n$ and back into the annular vessel $l$. The heat generated by the burning of the incandescent burner flame acts upon the thermostatic valve $c$ so as to cause the latter to close and thus shut off the supply of gas through the pipe $b$ so long as the lamp burner flame is alight. The closing of the pipe $b$ extinguishes the pilot flame. When the lamp burner flame is extinguished, the thermostatic valve moves back into its original position, thus opening again the gas supply to the pilot flame.

Having now described my invention what I claim as new and desire to secure by Letters Patent is.:

1. The combination with a burner, of a mercury holder disposed adjacent to the burner, a fuel chamber with which the burner communicates, an injector extending into the said chamber and communicating with the mercury holder, a gas supply pipe leading to said injector, and means for preheating the mercury holder, whereby to generate gas from the mercury adapted to actuate the injector for the purpose of injecting a mixed fuel into the fuel chamber.

2. The combination with a burner, of a mercury holder disposed adjacent to the burner, a fuel chamber with which the burner communicates, an injector extending into the said chamber and communicating with the mercury holder, a gas supply pipe leading to said injector, means for preheating the mercury holder, whereby to generate gas from the mercury adapted to actuate the injector for the purpose of injecting a mixed fuel into the fuel chamber, and means for automatically cutting off the preheating means when the main burner has beeen lighted.

3. The combination of a main burner, a holder disposed adjacent thereto and adapted to contain a volatile substance, a main gas pipe, a fuel chamber having connection with the main burner means actuated by the said volatile substance in a gaseous state for compressing air and gas in the fuel chamber, a pre-heating burner adjacent the holder and main burner, and a thermostatic valve for shutting off the preheating burner when the main burner is lighted.

In testimony whereof I have affixed my signature in presence of two witnesses.

WILLIBALD LIEDKE.

Witnesses:
HENRY HASPER,
WOLDEMAR HAUPT.

Copies of this patent may be obtained for five cents each, by addressing the "Commissioner of Patents, Washington, D. C."